Patented Feb. 20, 1934

1,947,946

UNITED STATES PATENT OFFICE 1,947,946

AZODYESTUFFS INSOLUBLE IN WATER AND PROCESS OF MAKING SAME

Leopold Laska and Arthur Zitscher, Offenbach-on-the-Main, Germany, assignors to General Aniline Works Inc., New York, N. Y., a corporation of Delaware No Drawing. Application May 3, 1929, Serial No. 360,308, and in Germany May 7, 1928

16 Claims. (260—79)

The present invention relates to valuable azodyestuffs insoluble in water and to a process of preparing them.

We have found that valuable azodyestuffs insoluble in water are obtained by combining any diazo-, tetrazo- or diazoazo compound with a 4-(2'-hydroxy-3'-naphthoyl-amino)-diphenylamine compound, none of these components containing sulfonic or carboxylic acid groups.

The new dyestuffs correspond to the general formula

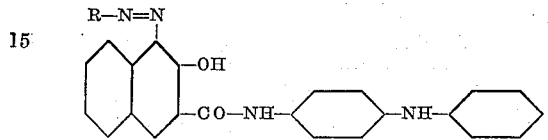

wherein R means an aromatic radical which may contain further arylazo groups and the benzene nuclei may be substituted by other monovalent substituents. They may be produced in substance and yield when mixed with the usual substrata valuable color lakes, or they may be prepared on the fiber and yield dyeings and printings of an excellent fastness especially to light. The shades vary from claret red to black, among which mainly the dark brownish red and brown shades are a valuable complement in the series of the ice-colors, being faster to light than hitherto obtainable in those shades by means of the known combinations of this group of the dyestuffs.

Especially remarkable and surprising is the fact that the dyeings produced from these arylides and tetrazotized dianisidine and aftertreated with copper compounds exhibit a fastness to light surpassing strongly that of the hitherto known dyestuffs prepared from this tetrazo compound and 2-hydroxy-3-naphthoyl-arylamines.

The 4-(2'-hydroxy-3'-naphthoylamino)-diphenylamine compounds are unknown hitherto and may be prepared for instance according to the process described in U. S. Patent No. 1,101,111.

In order to further illustrate our invention the following examples are given, the parts being by weight and all temperatures in centigrade degrees, but we wish it to be understood that we are not limited to the particular products or reaction conditions mentioned therein.

Example 1

Well boiled and dried cotton yarn is impregnated with a solution containing per liter 7 grs of 4-(2'-hydroxy-3'-naphthoyl-amino)-diphenylamine, 14 cc. of a caustic soda solution of 34° Bé. and 14 cc. of Turkey red oil, with further addition of 7 cc. of formaldehyde of 33% strength. Then the yarn is well wrung out and developed with a diazo solution containing per liter 1.42 grs. of 6-chloro-2-amino-toluene and being neutralized with sodium acetate and thereafter rinsed and soaped. In this manner a brownish red dyeing of a very good fastness to light is obtained. The dyestuff thus produced on the fiber corresponds to the formula:

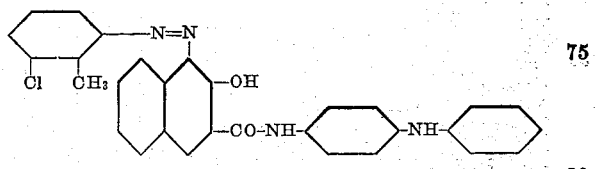

4-(2'-hydroxy-3'-naphthoyl-amino)-4''-nitro-diphenylamine yields when developed with the same diazo compound a brown dyeing of a likely good fastness to light.

Example 2

Cotton material previously treated in the customary manner is impregnated with a solution containing per liter 6 grs. of 4-(2'-hydroxy-3'-naphthoyl-amino)-2''-methoxy-diphenylamine, 15 cc. of a caustic soda solution of 34° Bé. and 6 cc. of Turkey red oil. Then the material is well wrung out and developed with a diazo solution neutralized with sodium acetate and containing per liter 1.52 grs. of 5-nitro-2-amino-anisole. Thereafter it is rinsed and soaped with a boiling soap solution. In this manner a dark reddish brown dyeing of a very good fastness to light is obtained. The dyestuff thus produced on the fiber corresponds to the formula:

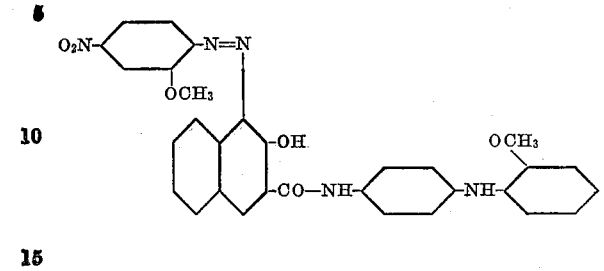

Example 3

Cotton yarn previously treated in an appropriate manner is impregnated as described in Example 1 and then well wrung out. Thereafter it is developed with a tetrazo solution neutralized with bicarbonate and containing per liter 2.44 grs. of dianisidine. Then it is well rinsed. The yarn thus dyed is boiled for half an hour in a solution containing per liter 2 grs. of copper sulfate and 2 cc. of acetic acid of 50% strength. Then it is rinsed and soaped.

In this manner a dark blue dyeing is obtained, distinguished by a very good fastness especially to light. The dyestuff thus produced on the fiber corresponds to the formula:

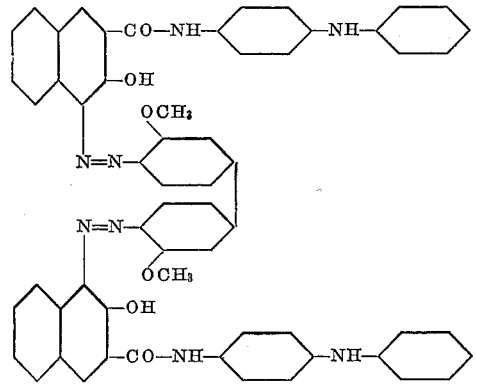

When 4-(2'-hydroxy-3'-naphthoyl-amino)-diphenylamine is replaced in this example by the corresponding 2''- or 4''-methoxy compound fast full dark blue shades, when it is replaced by the corresponding 4''-methyl- and 3''-chloro derivative more reddish dark blue shades are obtained.

With other diazo-, tetrazo- or diazoazo compounds and with other 4-(2'-hydroxy-3'-naphthoyl-amion)-diphenylamine compounds our process may be carried out likewise.

The following table gives the shades of a number of dyestuffs obtained according to this invention:

| Diazocompound of— | Combined with— | Shade |
|---|---|---|
| Meta-xylidine | 4-(2'-hydroxy-3'-naphthoyl-amino)-diphenylamine | Garnet. |
| 4-chloro-2-toluidine | Do | Brownish dark red. |
| 5-chloro-2-toluidine | Do | Brownish dark red. |
| 5-nitro-2-toluidine | Do | Dark reddish brown. |
| 5-nitro-2-anisidine | 4-(2'-hydroxy-3'-naphthoyl-amino)-diphenylamine | Deep garnet. |
| Ortho-amino-azo-toluene | Do | Brown garnet. |
| α-aminoanthraquinone | Do | Reddish brown. |
| Para-nitrobenzene-azo-para-amino-hydroquinone-dimethyl ether. | Do | Black. |
| Meta-chloro-aniline | 4-(2'-hydroxy-3'-naphthoyl-amino)-2''-methoxydiphenylamine | Orange brown. |
| 4-chloro-2-amino-1-ethyl-benzene | Do | Orange brown. |
| Meta-nitraniline | Do | Brown. |
| 2-chloro-4-nitraniline | Do | Dark brown. |
| Ortho-phenetole-azo-1-naphthylamine | Do | Black. |
| Meta-chloroaniline | 4-(2'-hydroxy-3'-naphthoyl-amino)-4''-methyl diphenylamine | Reddish brown. |
| 4-chloro-2-amino-diphenyl-ether | Do | Brownish red. |
| Ortho-nitraniline | Do | Reddish brown. |
| Meta xylidine | 4-(2'-hydroxy-3'-naphthoyl-amino)-4''-methoxy diphenylamine | Dark red like claret. |
| Meta-nitraniline | Do | Orange brown. |
| 5-nitro-2-anisidine | Do | Brown garnet. |
| Meta-chloroaniline | 4-(2'-hydroxy-3'-naphthoyl-amino)-3''-chloro diphenylamine | Reddish brown. |
| 4-chloro-2-toluidine | Do | Brownish red. |
| Ortho-nitraniline | Do | Reddish brown. |
| 5-nitro-2-toluidine | Do | Garnet. |
| 4-nitro-2-anisidine | Do | Dark red like claret. |
| 5-nitro-2-toluidine | 4-(2'-hydroxy-3'-naphthoylamino)-3''.4''-dichloro diphenylamine | Brownish red. |
| 5-nitro-2-anisidine | Do | Bluish red like claret. |
| 2.5-dichloro-aniline | 4-(2'-hydroxy-3'-naphthoyl-amino)-4''-nitro-diphenylamine | Reddish brown. |
| 6-chloro-2-toluidine | Do | Reddish brown. |
| 4-chloro-2-nitraniline | Do | Reddish brown. |
| 4.6-dichloro-3-toluidine | Do | Reddish brown. |
| Metra-nitraniline | Do | Brown. |
| α-amino-anthraquinone | Do | Reddish brown. |

We wish it to be understood that in the following claims the term "combining" means everywhere combining in substance or on a substratum especially on the fiber and that the term "diazo compound" comprises all diazotized aromatic amino compounds including such as contain already a diazo or azo group.

We claim:
1. A process which comprises combining any diazo compound of the benzene, naphthalene or anthracene series with a 4-(2'-hydroxy-3'-naphthoyl-amino)-diphenylamine compound of the general formula:

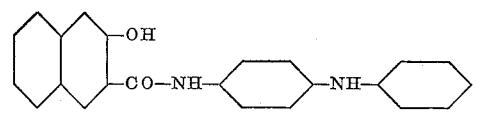

wherein the benzene nuclei may contain alkyl, alkoxy, halogen or nitro, substituents, none of these components containing sulfonic or carboxylic acid groups.

2. A process which comprises combining any diazo compound of the benzene, naphthalene or anthracene series not containing sulfonic or carboxylic acid groups with 4-(2'-hydroxy-3'-naphthoyl-amino)-diphenylamine of the formula:

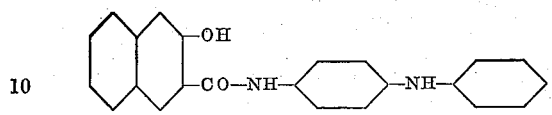

3. A process which comprises combining the tetrazo compound of dianisidine with a 4-(2'-hydroxy-3'-naphthoyl-amino)-diphenylamine compound of the general formula:

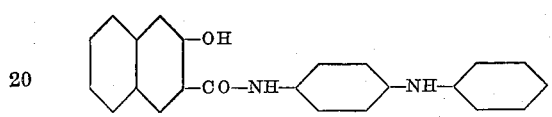

wherein the benzene nuclei may contain alkyl, alkoxy, halogen or nitro, substituents.

4. A process which comprises combining the tetrazo compound of dianisidine with 4-(2'-hydroxy-3'-naphthoyl-amino)-diphenylamine of the formula:

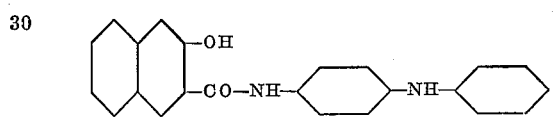

5. The azodyestuffs of the general formula:

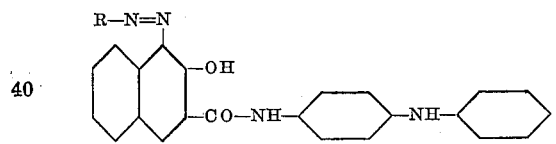

not containing sulfonic or carboxylic acid groups, wherein R means an aromatic radical of the group consisting of radicals of the benzene, naphthalene and anthracene series which may contain further aryl azo groups and the benzene nuclei may be substituted by alkyl, alkoxy, halogen or nitro, substituents, which compounds are when dry claret red to black colored powders, insoluble in water, yielding when mixed with the usual substrata valuable color lakes and when produced on the fiber dyeings and printings of a good fastness especially to light.

6. The azodyestuffs of the general formula:

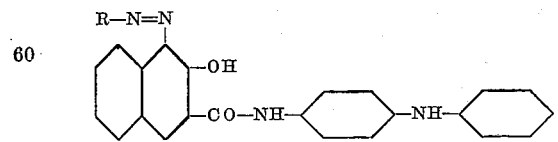

not containing sulfonic or carboxylic acid groups, wherein R means an aromatic radical of the group consisting of radicals of the benzene, naphthalene and anthracene series which may contain further aryl azo groups, which compounds are when dry claret red to black colored powders, insoluble in water, yielding when mixed with the usual substrata valuable color lakes and when produced on the fiber dyeings and printings of a good fastness especially to light.

7. The azodyestuffs of the general formula:

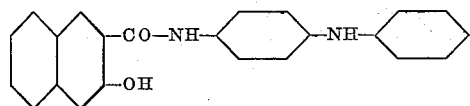
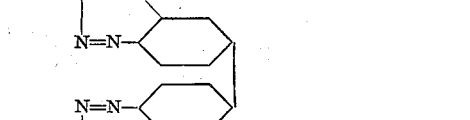
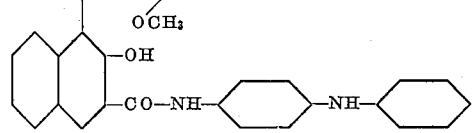

not containing sulfonic or carboxylic acid groups, wherein the benzene nuclei of the arylido-radicals may be substituted by alkyl, alkoxy, halogen or nitro, substituents, which dyestuffs are when dry dark powders insoluble in water, yielding when mixed with the usual substrata valuable color lakes and when produced on the fiber and aftertreated thereon with a copper compound dark blue dyeings of a good fastness especially to light.

8. The azo dyestuff of the formula:

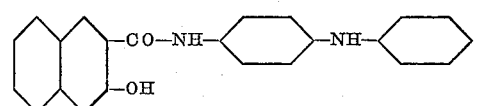
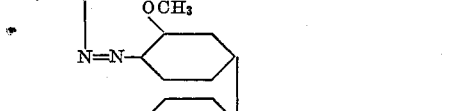
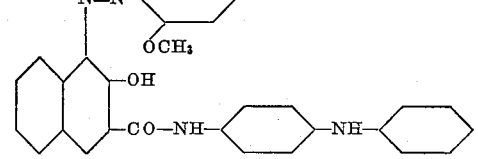

which dyestuff is when dry a dark powder, insoluble in water, yielding when mixed with the usual substrata valuable color lakes and when produced on the fiber and aftertreated thereon with a copper compound dark blue dyeings of a good fastness especially to light.

9. The azo dyestuff of the following formula:

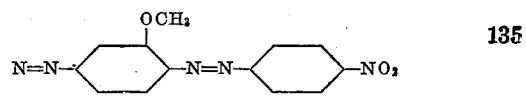
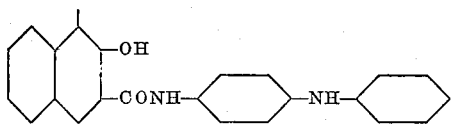

which dyestuff is when dry a black powder, insoluble in water, yielding when mixed with the usual substrata valuable color lakes and when produced on the fiber black dyeings of a good fastness especially to light.

10. The azo dyestuff of the following formula:

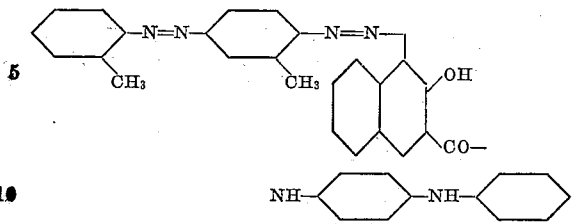

which dyestuff is when dry a dark powder, insoluble in water, yielding when mixed with the usual substrata valuable color lakes and when produced on the fiber brown garnet dyeings of a good fastness especially to light.

11. Fiber dyed with the azodyestuffs of claim 5,
12. Fiber dyed with the azodyestuffs of claim 6,
13. Fiber dyed with the azodyestuffs of claim 7,
14. Fiber dyed with the azodyestuff of claim 8,
15. Fiber dyed with the azo dyestuff as claimed in claim 9.
16. Fiber dyed with the azo dyestuff as claimed in claim 10.

LEOPOLD LASKA.
ARTHUR ZITSCHER.